United States Patent
McHugh et al.

[15] 3,675,566
[45] July 11, 1972

[54] VEHICLE BODY HEATING AND VENTILATING

[72] Inventors: John McHugh, Gorsey Lane Farm, Mawdsley, Lancashire; Gerald Fowler, 5 Marsden Close, Eccleston, Lancashire, both of England

[22] Filed: July 3, 1968

[21] Appl. No.: 742,275

[30] Foreign Application Priority Data

July 5, 1967 Great Britain......................30,981/67
July 5, 1967 Great Britain......................30,982/67

[52] U.S. Cl..................................................98/2.07, 98/8
[51] Int. Cl...............................................................B60h 1/24
[58] Field of Search..............................98/2.07, 2.06, 8, 10; 296/137 A

[56] References Cited

UNITED STATES PATENTS

| | | | |
|---|---|---|---|
| 3,352,224 | 11/1967 | Gillick | 98/10 |
| 2,171,622 | 9/1939 | Calkins | 98/2 RS |
| 2,476,295 | 7/1949 | Hans | 98/10 X |
| 2,696,155 | 12/1954 | Aherns | 98/10 |
| 3,008,694 | 11/1961 | Todd | 98/10 X |
| 3,237,545 | 3/1966 | Gillick | 98/10 |

*Primary Examiner*—Meyer Perlin
*Attorney*—Watson, Cole, Grindle & Watson

[57] ABSTRACT

A passenger vehicle having ducts formed within a roof between the latter and a lining, so that the vehicle will be ventilated and means are provided to deliver air above the windshield to be demisted and defrosted.

1 Claim, 3 Drawing Figures

INVENTORS
JOHN McHUGH
GERALD FOWLER

BY Watson, Cole,
Grindle & Watson
ATTORNEYS

VEHICLE BODY HEATING AND VENTILATING

The invention relates to coach heating and ventilation in passenger vehicles and to the use of warm air to demist or defrost vehicle windscreens. It will be described in its application to the ventilating, demisting, and heating of an omnibus or motor coach body but is equally applicable to other passenger vehicles such as railway coaches.

In accordance with the invention air is distributed to the passenger compartments of a vehicle by way of overhead ducting formed within a double roof between the roof and its lining. Such a system eliminates the problems usually encountered in the distribution of air by ducts at floor level or in the use of separate heat exchangers at various floor positions, due to door openings, wheel arches and so on.

Arising out of the first aspect of the invention it is proposed in accordance with a second aspect that a vehicle windscreen should be demisted and defrosted by means of air delivered from louvres positioned above the screen.

In order that the invention may be better understood, a system in accordance with it for distributing heating and ventilating air in a motor coach body and for demisting and defrosting by an overhead duct system will be described, by way of example, with reference to the accompanying drawings, in which.

Figure 1:
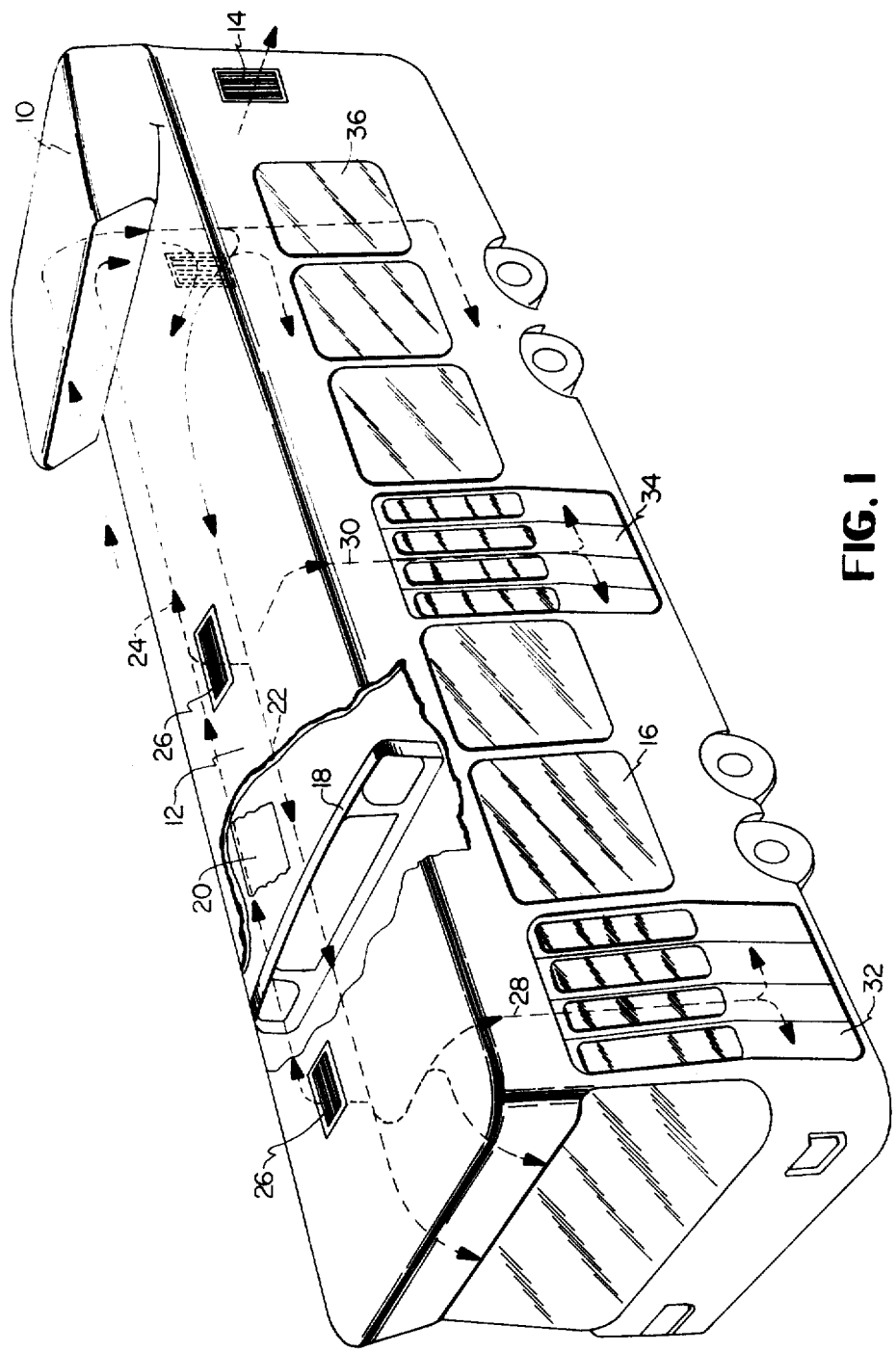
FIG. 1 is a perspective view of the vehicle.

The vehicle shown in the drawings has a rear mounted engine with which is associated an integrated air conditioning and engine cooling unit which is electronically controlled in response to the measured air temperature within the saloon and the measured engine coolant temperature.

There is an intake 10 for fresh air at the rear end of the roof 12 and spent air withdrawn from the saloon is exhausted by way of an external vent at 14.

The integrated unit functions to withdraw spent air from the saloon, to admix a regulated proportion of the withdrawn air with fresh air taken in by the intake 10 and to deliver the mixture at the required temperature to the saloon 16.

The greater part of the air distribution is effected by way of ducts formed in the double roof 12 of the vehicle between the outer skin and its lining. One roofstick is shown at 18, with the other roofsticks it is used to support a longitudinal partition 20 between a central heated air duct 22, the course of which is indicated by broken lines and the solid filled arrows, and the offside extractor duct 24, for air withdrawn from the soloon through overhead grills 26, the path of the spent air in the duct 24 being indicated by the diamond hatched arrows.

From the overhead duct 22 heated air is delivered by descending ducts at 28 and 30 to the screens or windows in the two doorways 32 and 34 and is also ducted under the rear seat at 36.

Figure 3:
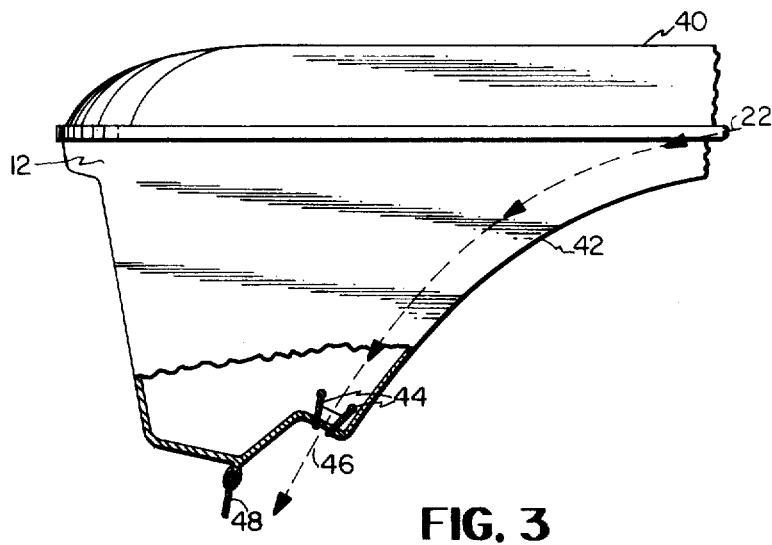
FIG. 3 is a section showing how the air made available in the duct formed in the double roof of the vehicle is directed onto the windscreen.
Figure 2:
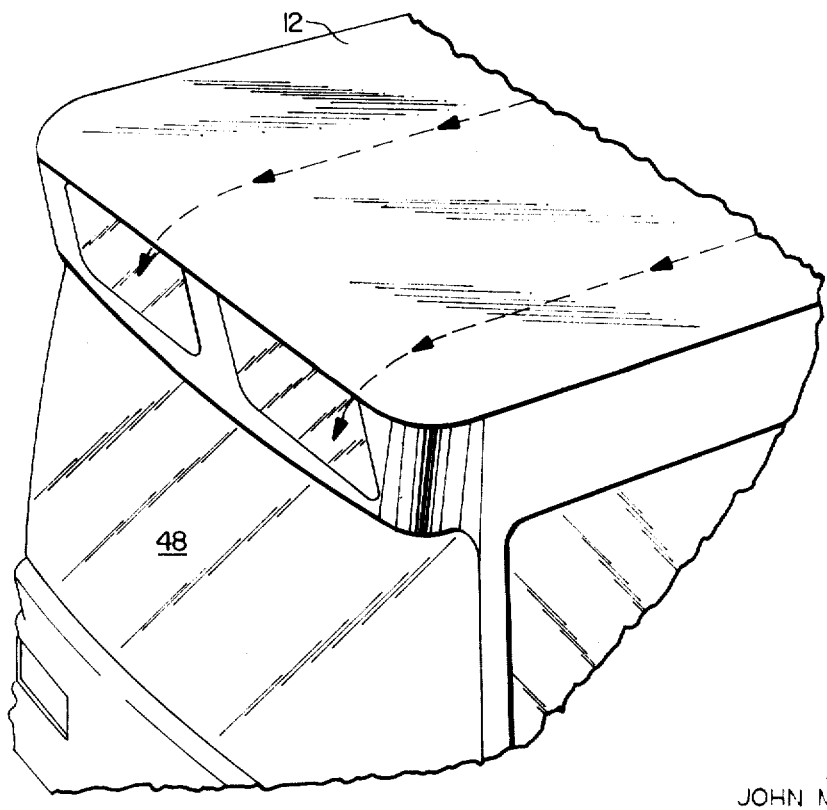
FIG. 2 is a perspective view of part of the front of the vehicle.

FIGS. 2 and 3 show how advantage can be taken of overhead ducting for the distribution of heated air to the passenger compartment of a vehicle to eliminate the separate hoses, clips, brackets and piping normally required when a vehicle windscreen is to be demisted or defrosted by conventional nozzles or slotted ducts along the base of the windscreen.

FIG. 3 shows how air made available in the central heated air duct 22 formed in the double roof 12 of the vehicle between an outer skin roof panel 40 and the lining 42 is directed and controlled by adjustable louvers 44 in a nozzle 46 onto the windscreen 48.

We claim:

1. A passenger vehicle having a double roof construction defined by an outer skin of the vehicle and a parallel lining spaced inwardly therefrom, ducts within the space defined by said skin and said lining, said ducts being defined by a longitudinal partition extending between and in contact with said skin and said lining, and said ducts together extending under the entire length and width of said roof for the distribution of air for ventilation of a passenger compartment below said double roof of the vehicle, grill means being provided in said lining for admitting spent air from said compartment into one of said ducts, and intake means being provided in said roof for admitting outside air and intermixing it with the spent air within said one duct and for directing it into the other one of said ducts, and means in said lining for directing the intermixed air into said passenger compartment and on to the windshield and door means thereof.

* * * * *